United States Patent [19]

Malinowski et al.

[11] Patent Number: 5,404,008
[45] Date of Patent: Apr. 4, 1995

[54] CONTROL SYSTEM FOR DETECTING INTRUSION OF A LIGHT CURTAIN

[75] Inventors: Mark E. Malinowski, Farmington Hills; Dennis A. Kramer, Troy, both of Mich.

[73] Assignee: Rockwell International Corporation, Pittsburgh, Pa.

[21] Appl. No.: 92,844

[22] Filed: Jul. 16, 1993

[51] Int. Cl.⁶ .................... G01V 9/04; G06M 7/00
[52] U.S. Cl. .................. 250/222.1; 250/214 B; 340/556
[58] Field of Search ............. 250/561, 222.1, 214 B, 250/221; 341/31; 340/555, 556, 557

[56] References Cited

U.S. PATENT DOCUMENTS

| | | |
|---|---|---|
| 4,402,609 | 9/1983 | Fetzer et al. |
| 4,431,309 | 2/1984 | Sick et al. |
| 4,517,559 | 5/1985 | Deitch ............... 250/221 |
| 4,725,726 | 2/1988 | Hasegawa et al. ......... 250/221 |
| 4,864,121 | 9/1989 | Pietzsch . |
| 4,875,761 | 10/1989 | Fetzer . |
| 4,888,479 | 12/1989 | Tamaru ............. 250/221 |
| 5,008,530 | 4/1991 | Ball . |
| 5,015,840 | 5/1991 | Blau . |
| 5,051,574 | 9/1991 | Yoshida et al. ........... 250/221 |
| 5,080,457 | 1/1992 | Fetzer et al. . |
| 5,179,369 | 1/1993 | Person et al. ........... 250/221 |

Primary Examiner—David C. Nelms
Assistant Examiner—Stephone B. Allen

[57] ABSTRACT

A light curtain system having a series of light emitting diodes is arranged to produce a beam of light which is modulated at about 40 KHz. The light is broadcast across a physical space in which intrusion detection is desired and received by respectively arranged photo diodes. Each of the light emitting diodes is connected in parallel to a single modulated power supply. Each photo diode produces an electrical signal having a magnitude which is proportional to the amount of light incident thereon. The signal produced by each photo diode is sequentially sampled and then compared to a reference value. If an intrusion in the respective region of the light curtain has occurred, the magnitude of the sampled signal will be less than the reference value providing indicia of an intrusion. Upon such a detection, the light curtain system provides indicia of the intrusion such that consequential remedial action in response thereto may be performed.

5 Claims, 2 Drawing Sheets

CONTROL SYSTEM FOR DETECTING INTRUSION OF A LIGHT CURTAIN

BACKGROUND OF THE INVENTION

1. Field of the Invention

This invention relates in general to light curtain systems for detecting the intrusion of objects into a protected zone and, more particularly, to a light curtain system which utilizes a minimum of electrical components.

2. Description of the Related Art

Light curtain systems are employed in a variety of applications to sense the intrusion of objects in or around a prescribed area. Light curtains typically are employed for operator protection around machinery, such as punch presses, brakes, molding machines, automatic assembly equipment, robotic operations, and the like. Conventional light curtain systems employ infrared light beams which project a light beam across an area to be protected. Intrusion of the light beam by an object, such as an operator's hand, are sensed by the circuit and may then trigger a warning signal, shut the machinery down, or otherwise safeguard the area.

Conventional light curtain designs employ a light receiver circuit having a series of photo diodes which respond to light signals. Each photo diode typically is coupled with a single operational amplifier to provide a fast and sensitive detection; but which on the other hand is relatively complex, expensive and failure prone.

Accordingly, it is an object of the present invention to provide an improved light curtain that has a minimum of electrical components providing lower cost and more reliable operation.

SUMMARY OF THE PRESENT INVENTION

The present invention includes a light curtain system having a series of light emitting diodes arranged to produce beams of light which is modulated at 40 KHz. The light beams define a control plane or curtain, the light emitting diodes being disposed on a first margin of the control plane. The light is broadcast across a physical space in which intrusion detection is desired and received by respectively arranged photo diodes. Each of the light emitting diodes is connected in parallel to a single modulated power supply. The photo diodes are disposed on a second margin of the control plane opposite and parallel to the first margin. Each photo diode produces an electrical signal having a magnitude which is proportional to the amount of light incident thereon. The signal produced by each respective photo diode is sequentially sampled and then compared to a reference value. If an intrusion in the respective region of the light curtain has occurred, the magnitude of the sampled signal will be less than the reference value providing indicia of an intrusion. Upon such a detection, the light curtain system provides indicia of the intrusion such that consequential remedial action in response thereto may be performed.

These and other aspects of the present invention will become more readily apparent by reference to the following detailed description of the embodiments as shown in the drawings.

DETAILED DESCRIPTION OF THE PREFERRED EMBODIMENT

Figure 1:
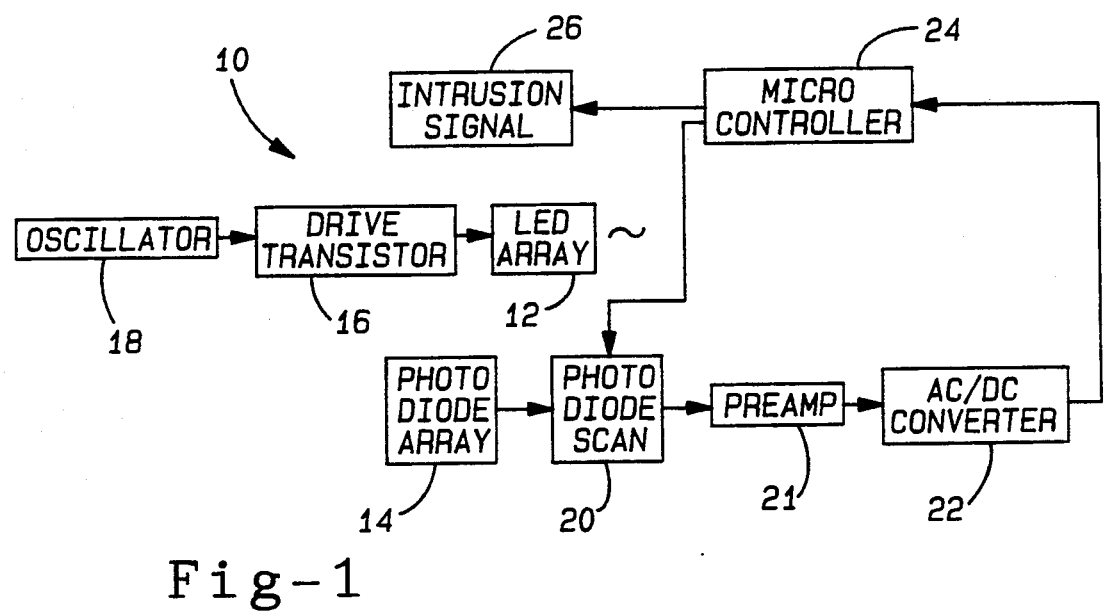
FIG. 1 is a block diagram of the components of the present invention.

The present invention comprises a light curtain 10 which is the region physically extending from LED array 12 to photo diode array 14, as shown in FIG. 1. LED array 12 provides a light source or beam in response to 40 KHz modulated power supplied by drive transistor 16 and oscillator 18. LED array 12 comprises a series of light emitting diodes arranged in a linear sequence to preferably define a beam across the region to be monitored. Photo diode array 14 comprises a series of photo diodes arranged in a linear sequence each preferably associated with a respective light emitting diode of LED array 12. Each photo diode produces an electrical signal having a magnitude which is proportional to the amount light incident thereon. Each photo diode is sequentially sampled by scanner 20 to provide an output from array 14 comprising a sequentially occurring sampling of the signal produced by each photo diode. The signal produced by photo diodes of array 14 is then amplified by preamp 21 and subsequently converted to a direct current (i.e., an amplitude) by conversion in an alternating current to direct current converter. A comparison is then performed in microcontroller 24 with a stored reference value to determine if a physical object has intruded light curtain 10. Upon such an incidence an intrusion detection incident will be provided at output 26 of microcontroller 24.

Figure 2:
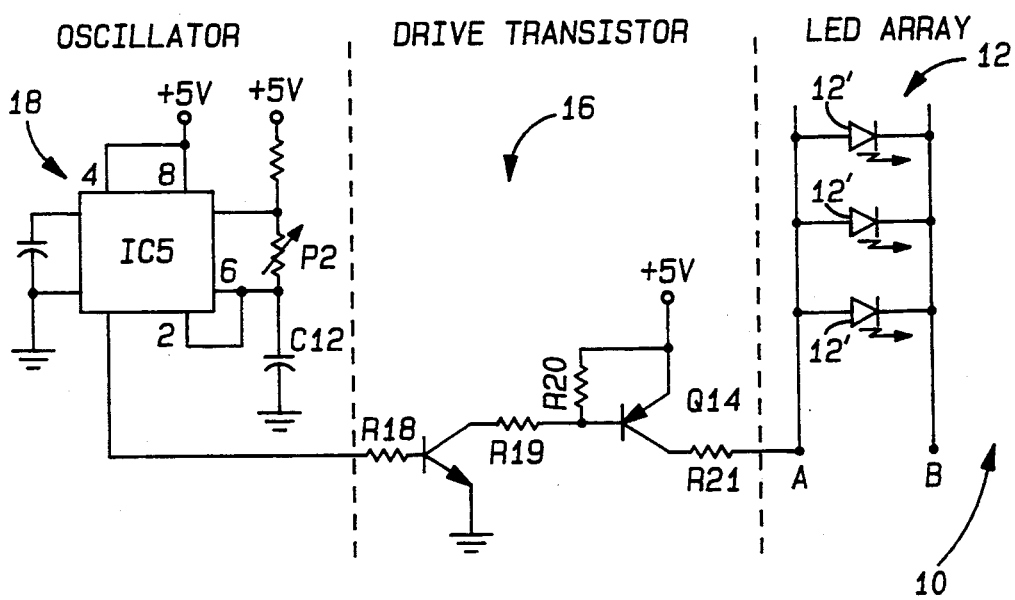
FIG. 2 is a schematic diagram of the first portion of the present invention.

The first circuit portion of light curtain 10 comprises an LED array 12 which is shown in FIG. 2. The array comprises a series of LEDs 12' arranged along parallel busses A and B as shown. Drive transistor Q14 provides a 40 KHz signal to LED array 12 in response to oscillator 18. Oscillator 18 utilizes IC5 which is a LM555.

Figure 3:
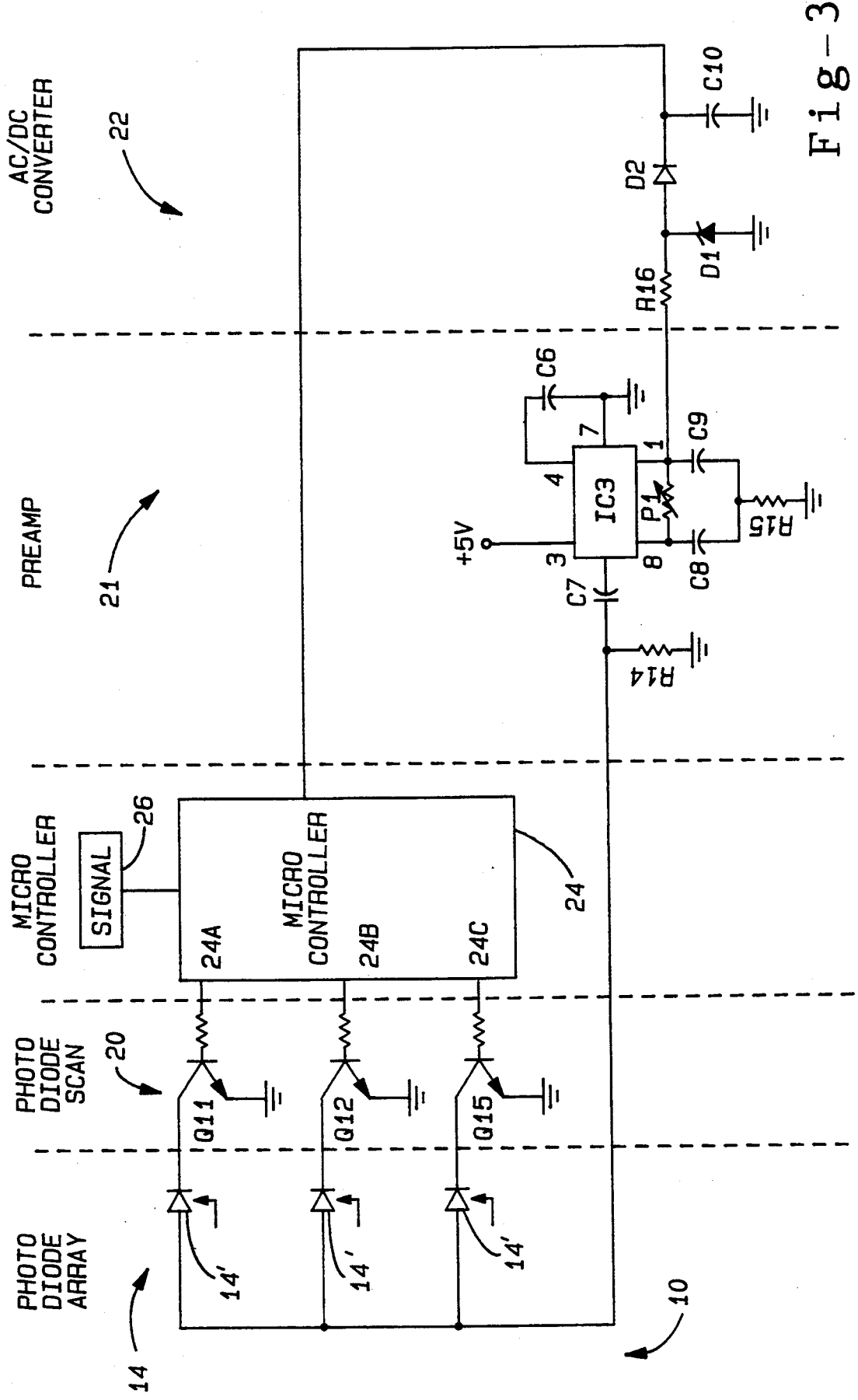
FIG. 3 is a schematic diagram of the second portion of the present invention.

The second circuit portion of light curtain 10, as shown in FIG. 3, comprises a photo diode array 14 shown as a respective array of photo diodes 14', each illuminated by a light emitting diode of array 12. Sequentially generated outputs 24A, 24B, 24C of microcontroller 24 sequentially gate a respective transistor sequentially completing a ground path to respective photo diodes of array 14, thereby providing a continuously repeating sampling of individual photo diodes of photo diode array 14.

Preamplifier 21 comprises an IC3 chip, which is preferably a Telefunken 2507. Ideally, the preamplifier is tuned to produce a narrow band amplification in the region of 40 KHz, thereby minimizing the effects of electronic noise and sunlight or background light on the system. The output of preamplifier 21 is then converted to direct current (i.e., an amplitude signal) which is then supplied to an input of microcontroller 24. Microcontroller 24 performs a compare function to determine the magnitude of the amplitude signal in comparison with a reference value. The magnitude of the amplitude signal will provide an indication of the presence of an obstruction in light curtain 10 when the detected signal falls below the reference value. Upon detection of an obstruction, an output signal is produced by microcontroller 24 at output 26 indicating the presence of an intrusion.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A control system adapted to detect intrusion of a control plane by an object;

said control system comprising a plurality of light sources arranged along a first margin of said control plane;

a plurality of light detectors arranged along a second margin of said control plane in generally parallel disposition with respect to said first margin, said light detectors being adapted to receive light emitted from the respective light sources, said light sources being connected in a parallel circuit to a power supply and adapted thereby to broadcast a light curtain across said control plane;

means for sequentially sampling output signals of said light detectors;

said parallel circuit including an oscillator circuit means for powering said light sources with a driving voltage of preselected frequency;

a band pass filter circuit means for establishing an output signal feedback control loop for said sequential sampling means whereby a narrow output signal band frequency near said preselected frequency is established thus reducing extraneous electronic noise and background light effects;

means for establishing and storing a reference output signal value indicative of a calibrated value;

means for comparing said output signals with said calibrated value and for developing a control system signal in response to detection of a predetermine difference between said reference signal and said output signals as a result of an intrusion of said light curtain.

2. The system set forth in claim 1 wherein said light curtain comprises a plurality of light beams developed by said light sources, said oscillator circuit means powering said light sources at a frequency of approximately 40 KHz.

3. The system set forth in claim 1 wherein said light sources comprise light emitting diodes.

4. The system set forth in claim 1 wherein said light detectors are photo diodes.

5. The system set forth in claim 4 wherein said light detectors comprise transistor circuit elements having bases adapted, when energized by said control system signal developing means, to connect said photo diodes to ground.

* * * * *